Jan. 23, 1923.
F. A. SCHNUPP.
CONVERTIBLE AUTOMOBILE BODY.
FILED MAY 31, 1921.
1,443,243.
3 SHEETS—SHEET 1.
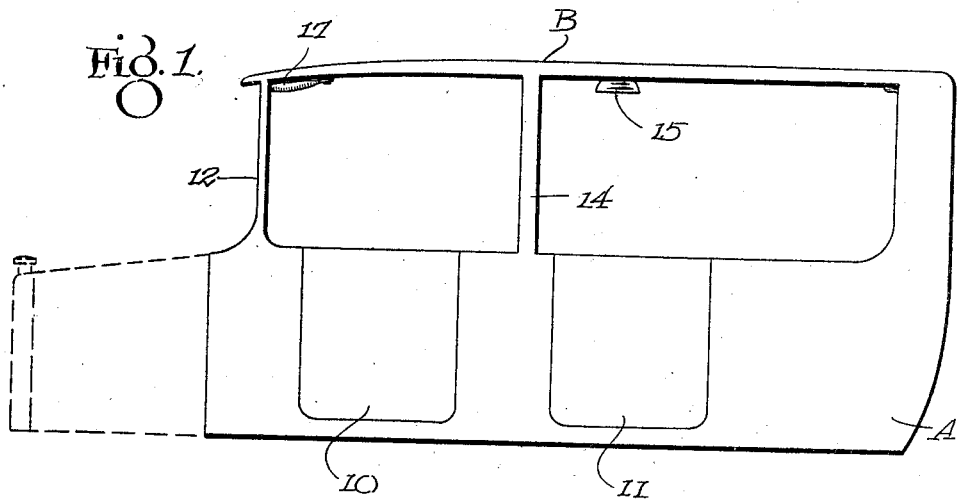
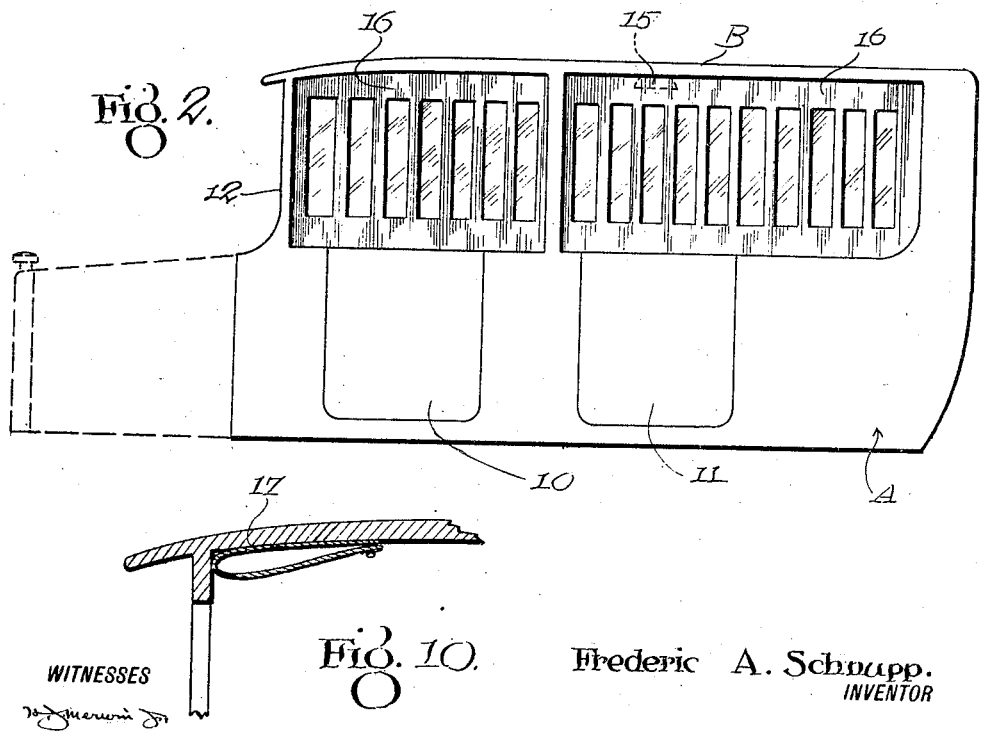
Frederic A. Schnupp.
INVENTOR Jan. 23, 1923.

F. A. SCHNUPP.
CONVERTIBLE AUTOMOBILE BODY.
FILED MAY 31, 1921.

WITNESSES

INVENTOR
Frederic A. Schnupp.
BY
ATTORNEYS

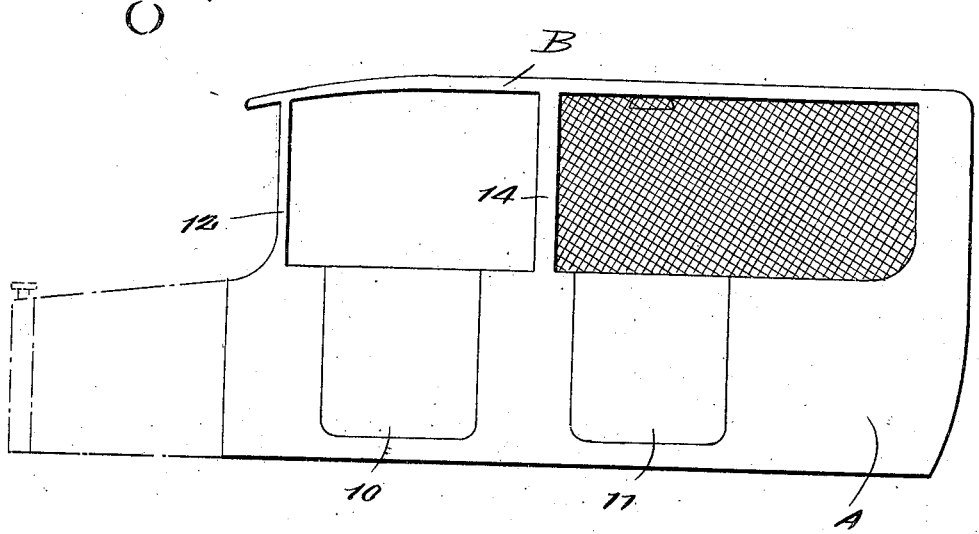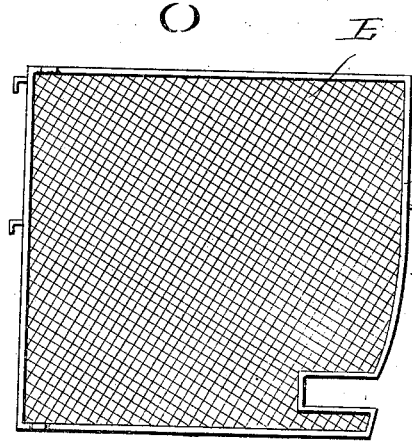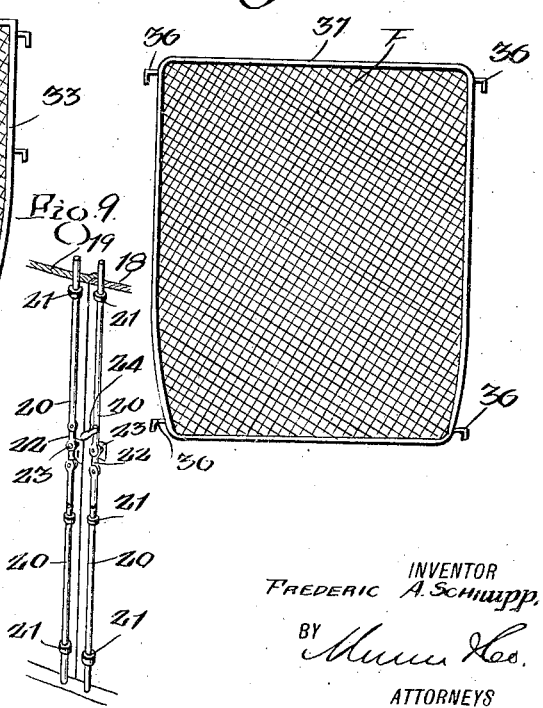

Patented Jan. 23, 1923.

1,443,243

UNITED STATES PATENT OFFICE.

FREDERIC ANDES SCHNUPP, OF MECHANICSBURG, PENNSYLVANIA.

CONVERTIBLE AUTOMOBILE BODY.

Application filed May 31, 1921. Serial No. 473,673.

*To all whom it may concern:*

Be it known that I, FREDERIC A. SCHNUPP, a citizen of the United States, and a resident of the city of Mechanicsburg, in the county of Cumberland and State of Pennsylvania, have invented certain new and useful Improvements in Convertible Automobile Bodies, of which the following is a full, clear, and exact description.

This invention relates to a convertible automobile or vehicle body.

The object of the invention is to provide a body which may be converted from a truck into a limousine or vice versa.

Other objects, and objects relating to details of construction, combination and arrangement of parts, will hereinafter appear.

The invention is illustrated by way of example in the accompanying drawings, in which:—

Figure 1 is a side elevation illustrating the invention as a limousine body,

Figure 2 is a view similar to Figure 1 but showing the body provided with curtains, Figure 4 is a side elevation illustrating the invention as a truck body.

Figure 7 is a side elevation of one of the gratings used when converting the body into a truck, Figure 8 is a view similar to Figure 7 and showing a form of grating which is used on each side of the body when converting the same into a truck, Figure 9 is a detail view illustrating the manner in which the rear doors of the body are locked, and Figure 10 is a detail view illustrating the manner in which the curtains are stored or carried when not in use.

Figure 3:
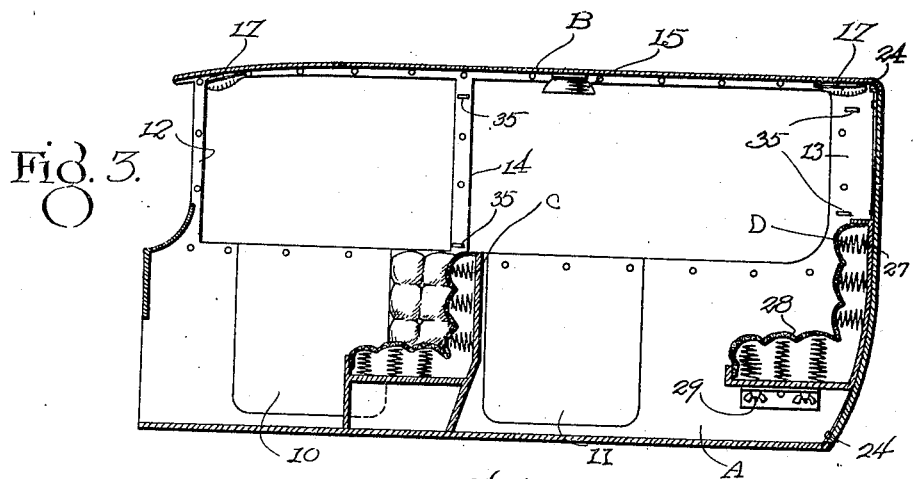
Figure 3 is a vertical longitudinal section of the same.
Figure 5:
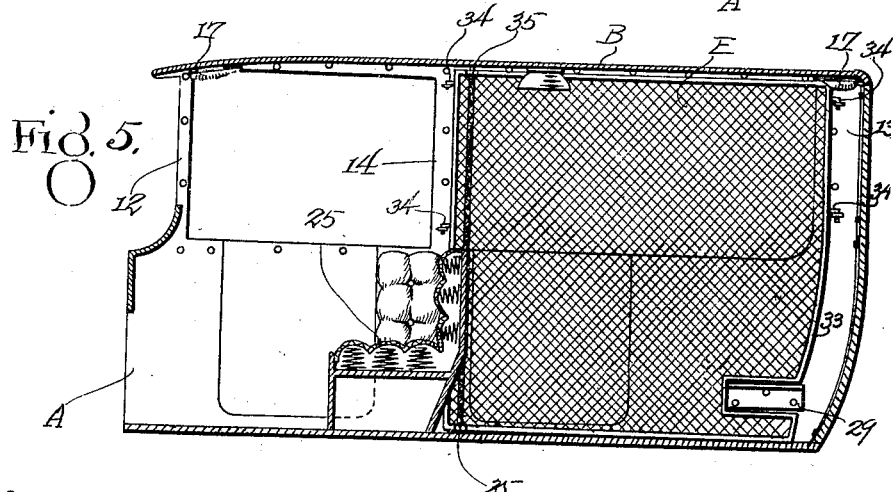
Figure 5 is a longitudinal vertical sectional view of the same.
Figure 6:
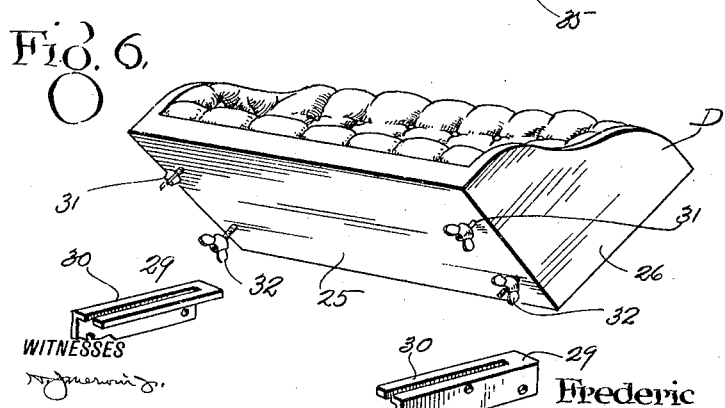
Figure 6 is a collective view showing the removable rear seat and its associated parts.

Referring to the drawings more particularly, A indicates generally an automobile body which is provided with two front doors 10 and the two tonneau doors 11, said doors being of the usual construction. The body is also provided with a top generally indicated at B, said top being supported at its front end by the windshield standards 12 and at its rear end by the side extensions of the body 13. Also the top is supported at its intermediate portion by the posts 14 and the top and body as a whole being shaped and curved so as to give the appearance of a limousine body. Also there may be mounted in the top a dome-light as indicated at 15. Curtains 16 may be employed for closing the space between the top and body if so desired, as shown in Figure 2, and the curtains may be stored when not in use in bags or containers 17, one of said containers being secured to the top at each end thereof as shown in Figures 1, 3 and 5. The rear end of the body A consists of a pair of doors 18 and 19, Fig. 9, which are hinged in a suitable manner to the body and side extensions 13 so that they may be swung outwardly. These doors are also formed to correspond to the general outlines of the limousine body and each door may be individually locked, the door 18 being locked from the interior, while the door 19 is locked from the outside of the body. Each door carries a pair of rods 20 which are suitably held by the eyes 21 for permitting the rods to move vertically. Each pair of rods is connected by a link 22 at their opposite ends, and said link is pivoted at its center, as at 23, and adapted to move the rods of each pair in opposite directions, when swung upon its pivot. The link 23 associated with the door 18 has a handle 24 secured thereto by which it may be manipulated from the inside of the door, while the link 22 of the door 19 is manipulated by a latch-key, not shown. The ends of the rods 20 are adapted to enter guideways in the body and top of the car, as indicated at 24' (Figures 3 and 5) and thus rigidly lock the doors against being opened.

There is also provided a front seat, generally indicated at C, and a rear seat generally indicated at D. The front seat is adapted to seat three people, and is stationary, while the rear seat is of the same size and removable. The rear seat consists of a boxing comprising a bottom 25, sides 26 and back 27 and in the boxing there is suitably positioned and mounted a seat spring structure, generally indicated at 28. The back 27 is curved to conform to the curvature of the doors 18 and 19 or, in other words, to the back of the limousine body, and the bottom 25 is seated upon the angle members 29, one of said angle members being secured upon each side of the body A, and the horizontal portion of each member is formed with a slot 30 which are adapted to slidingly receive the threaded studs 31 extending from the bottom 25 of the seat D. A pair of studs 31 are provided at each end of the seat and each stud is also provided with a wing nut 32. As is obvious by loosening the nuts 32 the seat may be quickly removed from its position.

Also there is provided a grating E for each side of the body, the grating in each instance being adapted to form a closure for the space between the top B and body A and also to cover the tonneau doors 11. The frame 33 of each grating is formed with a plurality of hooks 34 which are adapted to engage with eyes 35 secured to the post 14 and body extension 13 for holding the grating in position.

Each grating E is provided with an eye 35 adjacent the forward ends of the top and bottom portions of the frame 33. A third grating F is provided which is adaptd to extend between the forward ends of the gratings E and said grating F having hooks 36 formed with its frame 37 which are adapted to engage the eyes 35 of the gratings E. The grating F is of the same height as the grating E and adapted to form a closure between the back of the front seat C and the top B and also to protect the back of the seat C.

When it is desired to convert the present body heretofore described into a limousine body the seat D is placed in position and secured by manipulating the nuts 32 and the gratings E and F are removed. In utilizing the body as a truck the seat D is, of course, removed and the gratings E and F are placed in position. As is obvious in converting the body very little time is necessary.

It is also believed from the foregoing description that the advantages of the gratings D and E and likewise the pair of doors 18 and 19 when utilized in connection with a truck body may be understood.

While I have shown and described the preferred form, combination and arrangement of my invention I wish it to be understood that the same may be slightly changed by those skilled in the art without departing from the spirit of my invention as indicated by the appended claims.

Having thus described the invention, what I claim is:

1. In combination with a motor vehicle body having a top, a removable grating for each side of said body extending between the top and bottom thereof and in each instance adapted to form a closure between the top and the body and also protect the associated inner side wall of the body.

2. In combination with a motor vehicle body having a top, a removable grating for each side of said body extending between the top and bottom thereof and in each instance adapted to form a closure between the top and the body and also protect the associated inner side wall of the body, and a removable grating adapted to form a closure between the top and the back of the front seat of said motor vehicle body.

FREDERIC ANDES SCHNUPP.